United States Patent
Maalioune

(10) Patent No.: US 9,051,898 B2
(45) Date of Patent: Jun. 9, 2015

(54) THRUST REVERSAL DEVICE

(75) Inventor: Hakim Maalioune, Orgeval (FR)

(73) Assignee: AIRCELLE, Gonfreville L'Orcher (FR)

(*) Notice: Subject to any disclaimer, the term of this patent is extended or adjusted under 35 U.S.C. 154(b) by 810 days.

(21) Appl. No.: 13/264,951

(22) PCT Filed: Mar. 18, 2010

(86) PCT No.: PCT/FR2010/050488
§ 371 (c)(1),
(2), (4) Date: Oct. 17, 2011

(87) PCT Pub. No.: WO2010/119204
PCT Pub. Date: Oct. 21, 2010

(65) Prior Publication Data
US 2012/0036830 A1    Feb. 16, 2012

(30) Foreign Application Priority Data

Apr. 16, 2009    (FR) ..................... 09 52500

(51) Int. Cl.
| | | |
|---|---|---|
| *F02K 1/70* | (2006.01) | |
| *F02K 1/76* | (2006.01) | |
| *H02K 11/00* | (2006.01) | |
| *H02K 16/04* | (2006.01) | |

(52) U.S. Cl.
CPC ... *F02K 1/70* (2013.01); *F02K 1/76* (2013.01); *F02K 1/763* (2013.01); *H02K 11/0073* (2013.01); *H02K 16/04* (2013.01); *F05D 2270/52* (2013.01); *F05D 2270/54* (2013.01); *F05D 2270/62* (2013.01)

(58) Field of Classification Search
CPC .............. F02K 1/70; F02K 1/72; F02K 1/76; F02K 1/763; F02K 1/54; F05D 2270/52; F05D 2270/54; F05D 2270/62; H02K 16/04; H02K 11/0073; F01D 17/24; F02C 9/18
USPC .......................... 60/226.2, 230, 233
See application file for complete search history.

(56) References Cited

U.S. PATENT DOCUMENTS

| | | | |
|---|---|---|---|
| 6,439,504 B1 * | 8/2002 | Ahrendt ........................ | 60/226.2 |
| 6,526,744 B2 * | 3/2003 | Ahrendt ........................ | 60/226.2 |
| 6,786,039 B2 * | 9/2004 | Chakkera et al. ............. | 60/226.2 |
| 2002/0157376 A1 * | 10/2002 | Ahrendt ........................ | 60/226.2 |
| 2003/0015982 A1 * | 1/2003 | Cox-Smith et al. ........... | 318/433 |
| 2004/0139725 A1 * | 7/2004 | Colotte et al. ................ | 60/226.2 |
| 2004/0139726 A1 * | 7/2004 | Colotte et al. ................ | 60/226.2 |

(Continued)

FOREIGN PATENT DOCUMENTS

| | | |
|---|---|---|
| EP | 0843089 A1 | 5/1998 |
| EP | 1280029 A2 | 1/2003 |

(Continued)

OTHER PUBLICATIONS

International Search Report issued Jul. 1, 2010 by European Patent Office re: WO 2006/134253 A, FR 2 882 097 A, EP 1 280 029 A, FR 2 920 202 A, EP 1 413 736, FR 2 787 256 A and FR 2 872 222 A.

*Primary Examiner* — J. Gregory Pickett
(74) *Attorney, Agent, or Firm* — Brinks Gilson & Lione

(57) ABSTRACT

The invention relates to a thrust reversal device comprising at least one cowl arranged in such a way that it can be moved between a closed position and an open position, said cowl being actuated by at least one actuator that can be driven by at least one electric engine. The invention is characterized in that at least one electric engine is connected to at least two separate power supplies (7a, 7b).

9 Claims, 2 Drawing Sheets

(56) References Cited

U.S. PATENT DOCUMENTS

2008/0296106 A1* 12/2008 Nilsson ........................ 188/156
2009/0065634 A1* 3/2009 Marin Martinod ............. 244/54

FOREIGN PATENT DOCUMENTS

| | | |
|---|---|---|
| EP | 1413736 A1 | 4/2004 |
| FR | 2787256 A1 | 6/2000 |
| FR | 2872222 A1 | 12/2005 |
| FR | 2882097 A1 | 8/2006 |
| FR | 2902839 A1 | 12/2007 |
| FR | 2920202 A1 | 2/2009 |
| FR | 2927309 A1 | 8/2009 |
| FR | 2932226 A1 | 12/2009 |
| WO | 2006/134253 A1 | 12/2006 |

* cited by examiner

THRUST REVERSAL DEVICE

TECHNICAL FIELD

The present invention relates to a system for actuating a thrust reverser for a turbojet engine nacelle.

BACKGROUND

The role of a thrust reverser during landing of an airplane is to improve the braking capacity of the airplane by reorienting at least part of the thrust generated by the turbojet engine forward. In this phase, the reverser obstructs the jet nozzle of the gases and orients the jet stream from the engine toward the front of the nacelle, thereby generating a counter-thrust added to the braking of the airplane's wheels.

The means implemented to perform this reorientation of the stream vary depending on the type of reverser. However, in all cases, the structure of a reverser comprises mobile cowls that can be moved between, on the one hand, a deployed position in which they open a passage in the nacelle intended for the deviated stream, and on the other hand, a retracted position in which they close the passage. These mobile cowls can also perform a bypass function or simply an activation function for other bypass means.

In grid reversers, for example, the mobile cowls slide along rails so that by pulling back during the open phase, they reveal grids of bypass vanes arranged in the thickness of the nacelle. A system of connecting rods connects said mobile cowl to locking doors that deploy inside the exhaust duct and block the output in direct flow. In door reversers, on the other hand, each mobile cowl pivots so as to block the stream and deviate it, and is therefore active in said reorientation.

In general, these mobile cowls are actuated by hydraulic or pneumatic cylinders that require a grid for conveying a pressurized fluid. This pressurized fluid is traditionally obtained either by air bleed on the turbojet engine in the case of a pneumatic system, or by withdrawal on the hydraulic circuit of the airplane. However, such systems require significant maintenance because the slightest leak in the hydraulic or pneumatic grid can have harmful consequences both on the reverser and on other parts of the nacelle. Furthermore, due to the reduced available space in the forward frame of the reverser, the placement and the protection of such a circuit are particularly delicate and bulky.

To offset the various drawbacks related to the pneumatic and hydraulic systems, the builders of thrust reversers have sought to replace them and equip their electromechanical actuator reversers as much as possible, lighter and more reliable. Such a reverser is described in document EP 0 843 089.

The reliability and availability of such electrical systems are important considerations and constitute an important development area for electrical actuating systems.

Despite the advances in this field, in particular owing to synchronization methods, and breakdown, incident and other management, thrust reverser devices are still considered braking assistance devices and are not certified as completely separate braking systems. In fact, the braking function is a primary function that must have a breakdown likelihood below $10^{-7}$ per hour of flight for aeronautic certifications and not a secondary function for which the breakdown likelihood can be greater.

A need therefore exists for a thrust reversal system allowing greater availability and greater reliability of the system.

The availability criterion refers to the capacity for the thrust reversal system to be deployed in order to fulfill its braking assistance function.

The reliability is the measurement of the operating or breakdown likelihood of a system used under particular conditions and for a given time. In aeronautics, this size characterizes the operating security of equipment.

One solution to improve the availability of a system is to increase the reliability of its components.

However, aeronautic equipment is already being developed to have optimal reliability and there is a need for an architectural solution making it possible to further improve this availability and reliability.

BRIEF SUMMARY

In order to offset all or part of the aforementioned problem, the present invention relates to a thrust reversal device comprising at least one cowl mounted so as to be mobile between a closing position and an opening position, said cowl being actuated by at least one actuator able to be driven by at least one electric motor, characterized in that at least one electric motor is connected to at least two separate power supplies.

In fact, it has appeared that the power supply is generally the weakest link in the chain in terms of reliability. Thus, by providing a dual power supply for each electric motor driving actuators, the reliability of the system is greatly increased.

Advantageously, each electric motor will be connected to two separate power supplies.

Preferably, the electric motor is a dual-winding electric motor, each winding being connected to a separate power supply from the power supply of the other winding.

According to one alternative embodiment, at least one actuator is associated with a unique electric motor.

Alternatively or complementarily, at least one electric motor can drive at least two actuators.

Advantageously, the thrust reversal device is an electrically synchronized thrust reversal device. Such an electric synchronization method is described in application FR 08/03157 filed on Jun. 6, 2008 and not yet published.

Preferably, the first power supply is connected to a first control and steering unit, and the second power supply is connected to a second control and steering unit, each control and steering unit being powered by a unique power supply.

Advantageously, each control and steering unit is connected to an airplane controller that can send control instructions to the thrust reversal device.

Complementarily, the thrust reversal device comprises a variable jet nozzle device.

Advantageously, the mobile cowl performs a variable jet nozzle function. Such a thrust reversal device in which the mobile cowl can itself perform the function of variable nozzle is for example described in application FR 2 902 839. Such a system is advantageous because the same cylinders are used to actuate the mobile cowl in a thrust reversal mode or a variable jet nozzle mode. The increased availability of the system makes it possible for the variable jet nozzle function to be performed by the cylinders of the thrust reversal device.

Also advantageously, the power supplies can be switched between a first control position of the variable jet nozzle and a second position for controlling the thrust reverser. Such a system is for example described in application FR 08/00772 filed on Feb. 13, 2008 and not yet published.

BRIEF DESCRIPTION OF THE DRAWINGS

The present invention will be better understood in light of the following detailed description relative to the appended drawing, in which.

DETAILED DESCRIPTION

Before describing one embodiment of the invention in detail, it is important to specify that the described device is not limited to one particular type of reverser. Although illustrated by a grid reverser comprising mobile cowls sliding along rails, it may be implemented with reversers having different designs.

Figure 1:
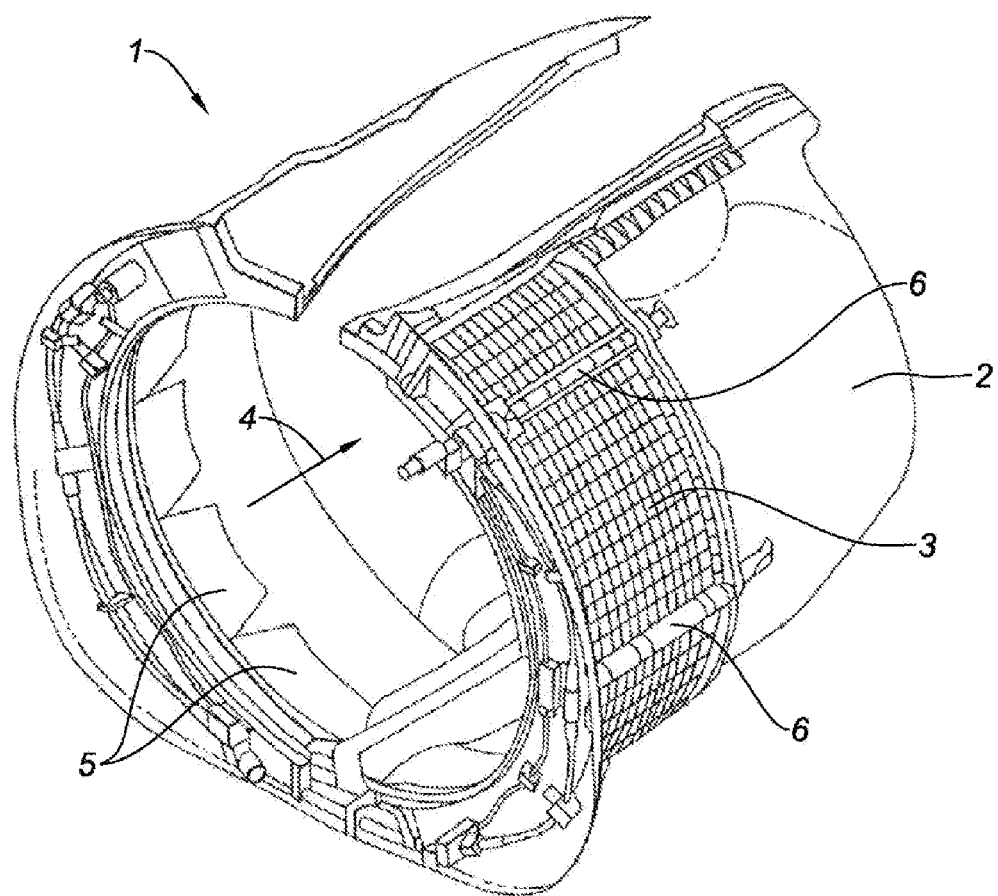
FIG. 1 is a general diagrammatic illustration of a thrust reversal device.

FIG. 1 shows a partial diagrammatic view of a nacelle incorporating a thrust reverser 1. The turbojet engine is not shown.

This thrust reverser 1 has a structure comprising two semicircular mobile cowls 2 able to slide along rails (not visible) to expose grids 3 of bypass vanes placed between the mobile cowls 2 and a passage section for the flow of air 4 to be deviated. Blocking doors 5 are arranged inside the structure so as to be able to pivot and go from a position in which they do not hinder the passage of the flow of air 4 to a position in which they at least partially block that passage. In order to coordinate the opening of the mobile cowls 2 with a position covering the blocking doors 5, these are mechanically connected to the mobile cowl 2 by hinges and a system of connecting rods (not shown).

The movement of the mobile cowls 2 is ensured by a set of electromechanical actuators 6 mounted on a front frame.

In the case at hand, each mobile cowl 2 is actuated using three electromechanical actuators 6 each comprising a mechanical shaft 6b controlled by an associated control housing 6a comprising an electric motor.

The electric motor is a dual-winding electric motor 7a, 7b. According to the invention, each winding is electrically powered by a separate power source 10a, 10b via a dedicated control unit 11a, 11b and controlling the power for each electric motor on the concerned power (path a, path b).

Each control unit 11a, 11b is also connected to a resolver 12a, 12b of each actuator 6 making it possible to monitor the status and position of the cylinder and the control unit to steer the motors accordingly following a particular control strategy. This in particular makes it possible to set up an electric synchronization between the actuators.

Of course, one will note that the opening and closing instructions for the thrust reversal device and other orders are sent upstream by a FADEC 13 (Full Authority Digital Engine Controller), i.e. an upper airplane control and command unit. The FADEC 13 will advantageously also comprise two command paths 13a, 13b.

Of course, the control units 11a, 11b could be grouped together in a same control unit with segregated processing paths.

Thus, in the event of a power breakdown or failure of a control circuit, a second control circuit is available and could make it possible to ensure the operation of the thrust reversal device.

The choice of the controller 11a, 11b in primary control may, for example, be left to the FADEC 13, the other controller then being on standby.

The choice could also be made by the control units 11a, 11b themselves, with determination of a primary controller and a secondary controller or a strategy where each controller is primary controller in turn with a change upon each start-up of the controllers so as to ensure that each path is frequently activated and minimize dormant breakdowns.

In the event of a failure of the path (a or b) of the primary controller, the controller on standby on the other path (b or a) takes over.

Figure 3:
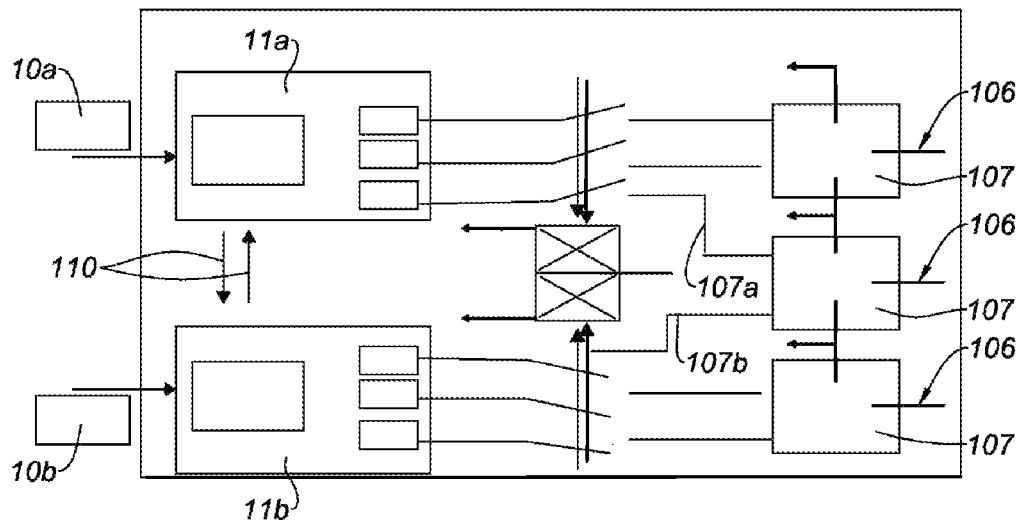
FIG. 3 is a diagrammatic illustration of an alternative embodiment of the invention, the device comprising a variable jet nozzle function.

The system shown in FIG. 3 illustrates the invention applied to a thrust reversal device comprising a downstream variable jet nozzle section as described in particular in application FR 2 902 839.

Figure 2:
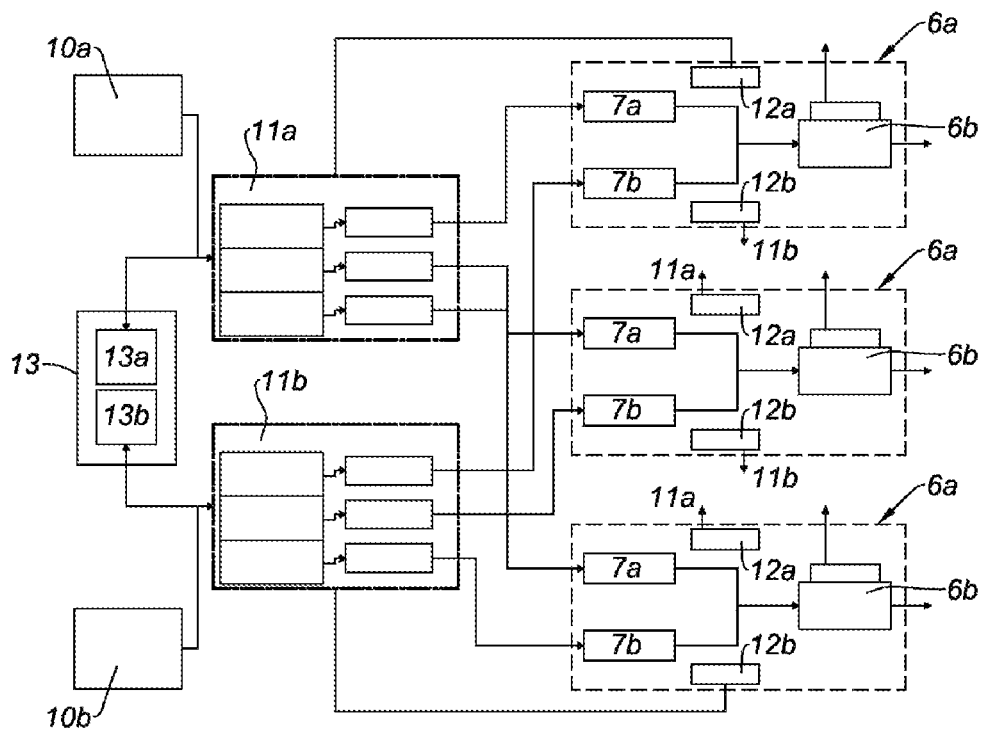
FIG. 2 is a functional diagrammatic illustration of a thrust reversal device according to the invention.

Similarly to the system shown in FIG. 2, the system shown in FIG. 3 comprises two power sources 10a, 10b each powering a control unit 11a, 11b. The control units 11a, 11b can communicate with each other via crossed communication channels 110.

The variable-section nozzle of the mobile cowl is actuated by three electromechanical actuators 106, each driven by an electric motor 107, the central electric motor being powered by two separate power sources 107a, 107b while the two lateral electric motors are powered dually by the same control unit 11a, 11b.

Although the invention has been described with one particular embodiment, it is of course in no way limited thereto and comprises all technical equivalents of the means described as well as combinations thereof if they are within the scope of the invention.

The invention claimed is:

1. A thrust reversal device for an aircraft comprising at least one cowl mounted so as to be mobile between a closing position and an opening position, said cowl being actuated by at least one actuator able to be driven by at least one electric motor, wherein at least one electric motor is connected to at least two separate power supplies, and the electric motor is a dual-winding electric motor, each winding being connected to a separate power supply from the power supply of the other winding.

2. The device according to claim 1, wherein at least one actuator is associated with a unique electric motor.

3. The device according to claim 1, wherein at least one electric motor can drive at least two actuators.

4. The device according to claim 1, wherein the thrust reversal device is an electrically synchronized thrust reversal device.

5. The device according to claim 1, wherein the first power supply is connected to a first control and steering unit, and the second power supply is connected to a second control and steering unit, each control and steering unit being powered by a unique power supply.

6. The device according to claim 5, wherein each control and steering unit is connected to an airplane controller that can send control instructions to the thrust reversal device.

7. The device according to claim 1, wherein the thrust reversal device comprises a variable jet nozzle device.

8. The device according to claim 7, wherein the mobile cowl performs a variable jet nozzle function.

9. The device according to claim 7, wherein the power supplies can be switched between a first control position of the variable jet nozzle and a second position for controlling the thrust reverser.

* * * * *